United States Patent

Weber

[15] 3,673,777
[45] July 4, 1972

[54] BLADE MOUNTING MEANS

[72] Inventor: Edwin J. Weber, Baltimore, Md.

[73] Assignee: The Black and Decker Manufacturing Company, Towson, Md.

[22] Filed: Sept. 3, 1970

[21] Appl. No.: 69,329

[52] U.S. Cl............................56/17.5, 29/432.1, 29/525, 56/12.8, 287/53 SS
[51] Int. Cl. .......................................A01d 35/26
[58] Field of Search .........................56/17.5, 255, 295, 12.8; 29/432, 432.1, 525; 287/52.05, 53 R, 53 SS

[56] References Cited

UNITED STATES PATENTS

| 1,157,666 | 10/1915 | Bennett | 29/525 |
| 2,197,883 | 4/1940 | Sinclair | 29/525 UX |
| 2,547,328 | 4/1951 | Koch et al | 56/17.5 X |
| 2,636,254 | 4/1953 | Gunning | 29/432 X |
| 3,034,275 | 5/1962 | Happe et al | 56/17.5 X |
| 3,055,100 | 9/1962 | Kimpel | 287/53 X |
| 3,074,292 | 1/1963 | Polmon | 59/525 UX |
| 3,474,519 | 10/1969 | Hallesy | 29/525 X |

Primary Examiner—Louis G. Mancene
Assistant Examiner—J. A. Oliff
Attorney—Leonard Bloom, Joseph R. Slotnik and Edward D. Murphy

[57] ABSTRACT

A coupling assembly for attaching a plastic part to a metal shaft, such as a blade holding hub to an electric motor shaft in a grass trimming device. The coupling comprises a plurality of knurled portions spaced along the shaft at the location of the plastic part. The plastic part is provided with a bore equal in diameter to that of the shaft and is press fitted over the shaft so that the knurled portions compress the plastic. The portion of the plastic which passes beyond the knurled portions and between the knurled portions returns via elastic cold flow to a diameter less than that of the knurled portions so that the plastic part is axially locked by multiple surfaces.

2 Claims, 5 Drawing Figures

PATENTED JUL 4 1972

3,673,777

INVENTOR.
EDWIN J. WEBER
BY
Edward D. Murphy

BLADE MOUNTING MEANS

The present invention relates to the joining of plastic parts to metal shafts.

Difficulties are frequently encountered when plastic members such as fan hubs or output insulating or coupling devices, etc. are joined to the metal shaft of, for example, an electric motor. For example, the plastic member may loosen on the shaft due to the abrasion of the inner surface of the plastic which occurs when the member is pressed onto the shaft. Devices for overcoming this problem such as knurling or ridges cut into the surface of the shaft are not sufficiently effective. The purpose of this invention is to overcome these difficulties by providing an improved coupling for such members.

Accordingly, the primary object of this invention is the provision of an improved method of joining plastic members to metal shafts which provides better retention of the plastic member.

Another object of this invention is the provision of an improved coupling between a plastic member and a metal shaft.

It is a specific object of this invention to provide an improved coupling for joining the plastic blade-holding hub of a cutting device to an output shaft which is driven by an electric motor.

Further objects and advantages of this invention will become apparent as the description and illustration thereof proceed.

Briefly, in accord with one embodiment of this invention, an improved coupling is provided wherein a plastic part is prepared having a bore of substantially the same diameter as the shaft on which it is to be mounted. The shaft is provided with a plurality of knurled or ridged portions spaced apart over a distance at least equal to the length of the bore in the plastic. The knurls are cut the usual manner so as to raise portions of the metal to a diameter greater than the nominal shaft diameter. The plastic member is pressed onto the shaft forming a coupling in which the plastic is compressed outwardly in the region of the knurled portions but cold flows back toward its initial diameter in the spaces between the knurled portions. Thus the plastic part is held against circumferential movement by its engagement with the knurled portions and against axial movement by the abutment of the relaxed plastic against the ends of the knurled regions.

Figure 1:
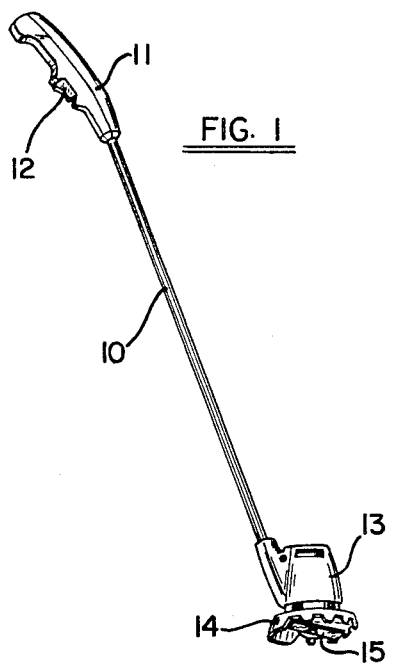
FIG. 1 is a perspective view of a grass trimming device embodying the present invention.

In FIG. 1, a grass trimming device which utilizes the coupling assembly of the present invention is illustrated. This device comprises an extended handle 10 having a grip portion 11 and a trigger 12. At the other end of the extended handle 10 a casing 13 is provided which encloses an electric motor, not shown. Beneath the casing, a guard member 14 encloses a blade 15 which is adapted for rotation in a horizontal plane for grass cutting. To operate the device, it is coupled to a source of power such as a battery or an A.C. outlet. Depression of the trigger 12 applies power to the motor and causes rotation of the blade.

Figure 2:
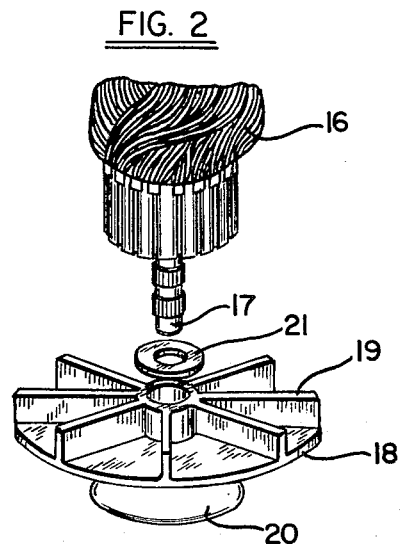
FIG. 2 is an exploded view of the specific parts of the device of FIG. 1 which embody this invention.

FIG. 2 illustrates the lower extremity of a motor armature 16 which is located within the housing 13. This view also shows the shaft 17 extending from the armature to drive the blade. A plastic hub member 18 is attached to the shaft 17 by means of the coupling assembly of this invention. The member 18 is conveniently shaped to provide fan blades 19 for drawing cooling air through the motor and also includes a cylindrical portion 20 to which the blade 15 is mounted. Preferably, this mounting comprises the spring clip and groove arrangement described and claimed in my co-pending application, Ser. No. 65,953, filed Aug. 21, 1970, and assigned to the assignee of this invention. Immediately above the insulating member 18, a washer 21 may be provided to space the plastic member from the upper structure of the motor.

Figure 3:
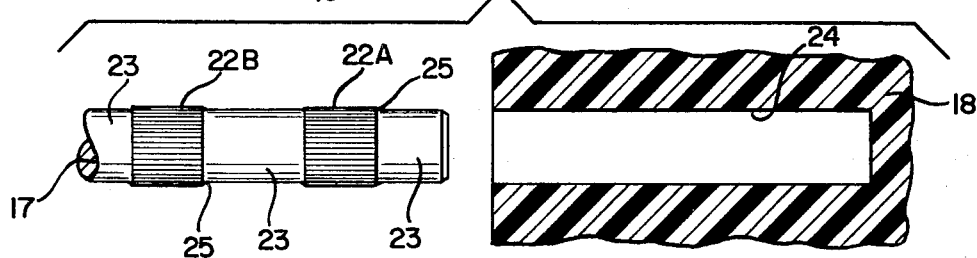
FIG. 3 is a cross sectional view of the coupling of this invention immediately prior to assembly.
Figure 4:
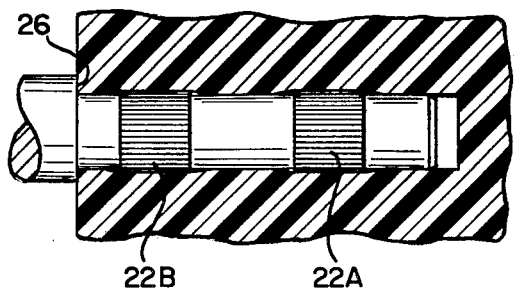
FIG. 4 is a cross sectional view of the coupling of this invention after assembly.

A detailed view of the coupling arrangement of this invention is shown prior to assembly in FIG. 3 and after assembly in FIG. 4. In FIG. 3, the shaft 17 can be seen to have two knurled portions 22A and 22B spaced from the end of the shaft. These knurled portions comprise alternating ridges and depressions formed in the customary manner by rolling hardened teeth over the shaft and causing the metal to flow so that outer diameter of the peaks is greater than the initial outer diameter of the shaft. Regions 23 of the shaft, between the knurled portions and beyond the ends thereof, remain at the original diameter of the shaft. Also in FIG. 3, it can be seen that the plastic hub 18 is provided with a bore 24, the inner diameter of which is substantially the same, within manufacturing tolerance, as the diameter of the shaft 17. Also, the length of the bore is greater than the length of the shaft over which the knurled portions extend.

To assemble these parts, the plastic member 18 is presses onto the shaft 17. Initially, the shaft fits tightly within the leading portion of the bore 24. As the plastic encounters the tapered leading edges 25 of the first knurled portion, the plastic is compressed away from the shaft so that the shaft continues to enter the bore. When the plastic hub 18 is located as desired on the shaft 17, which may be provided for by means of a shoulder 26 shown in FIG. 4, the plastic is tightly inter-fitted with the ridges and depressions of the knurled portions 22, thus preventing relative rotation between the shaft and the plastic hub unless the yielding stress of the plastic should be exceeded.

Figure 5:
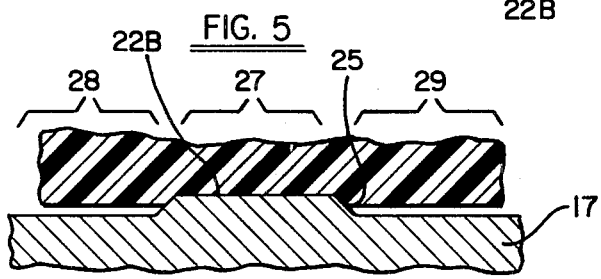
FIG. 5 is an enlarged cross sectional view of a portion of FIG. 4.

FIG. 5 is a detailed view of one of the knurled portions 22, specifically the knurled portion 22B of FIG. 4. FIG. 5 represents a cross-sectional view through one of the ridges of the knurled portion and it can be seen therein that the plastic at the axial location of the rib has been compressed radially outwardly by the tapered leading edge of the rib. The plastic material in the region 28, to the left of the knurled portion has passed over both of the ribbed portions 22A and 22B while the plastic in the region 29, to the right of the knurled portion shown in FIG. 5 has only passed over the first of the knurled portions, 22A. In both cases, the plastic in alignment with the ridge has been compressed to the outer diameter of the ridge and has subsequently relaxed to a smaller inner diameter than the diameter of the ridge. This is due to the fact that the compression of the plastic is partially elastic and, to the extent that it is elastic, the plastic will return either partially or completely to its original diameter. In accord with the present invention, the provision of multiple knurled portions spaced along the shaft combined with the elastic cold flow of the plastic back to its original shape provides multiple locking surfaces which are substantially more effective in preventing axial movement of the part 18 than previous assemblies. The axial strength of this assembly is substantially greater than that provided by a continuously extending knurled portion on which the plastic is mounted.

It will be clear to those skilled in the art that many changes and modifications may be made form the specific illustration without departing from the true spirit and scope of this invention. Accordingly, it is intended that the appended claims be interpreted to cover all such designs as may fall within the true spirit and scope of this invention.

I claim:

1. In a grass cutting device including an electric motor, a shaft driven by said motor and a blade coupled to said shaft for rotation therewith, the improvement comprising:

a plurality of knurled portions axially spaced along said shaft and spaced from the end thereof;

a pliable plastic insulating hub member for receiving a blade mounting means thereon;

said hum member having a central bore therein of substantially the same diameter as said shaft and fitted tightly thereto;

said knurled portions extending into said hub member and said hub member extending close to said shaft between said knurled portions;

whereby said hub member is retained against rotational or axial movement relative to said shaft.

2. The device claimed in claim 1 wherein the outer diameter of said knurled portions is greater than the inner diameter of said hub member.

* * * * *